(12) United States Patent
Chiu et al.

(10) Patent No.: US 7,808,476 B2
(45) Date of Patent: Oct. 5, 2010

(54) PIXEL STRUCTURE

(75) Inventors: Chun-Chang Chiu, Taoyuan (TW);
Shih-Chang Chu, Taoyuan (TW);
Chih-Min Yang, Taoyuan (TW)

(73) Assignee: Au Optronics Corporation, Hsinchu (TW)

( * ) Notice: Subject to any disclaimer, the term of this patent is extended or adjusted under 35 U.S.C. 154(b) by 859 days.

(21) Appl. No.: 11/561,896

(22) Filed: Nov. 21, 2006

(65) Prior Publication Data

US 2008/0079884 A1 Apr. 3, 2008

(30) Foreign Application Priority Data

Sep. 29, 2006 (TW) .................. 95136208

(51) Int. Cl.
*G02F 1/1343* (2006.01)
(52) U.S. Cl. ..................................... 345/143
(58) Field of Classification Search .............. 349/143, 349/144; 345/95
See application file for complete search history.

(56) References Cited

U.S. PATENT DOCUMENTS 4,840,460 A 6/1989 Bernot et al.
5,777,700 A 7/1998 Kaneko et al.
6,342,939 B1 1/2002 Hirata et al.
6,795,142 B2 * 9/2004 Chae et al. .................. 349/106
2006/0007082 A1 1/2006 Chiu

FOREIGN PATENT DOCUMENTS

CN 1536415 10/2004
CN 1719321 1/2006

\* cited by examiner

*Primary Examiner*—Sarah Song
(74) *Attorney, Agent, or Firm*—Jianq Chyun IP Office (57) ABSTRACT

A pixel structure is provided. A scan line and a data line are disposed over a substrate. A first, second, and third thin film transistors are electrically connected with the data line and the scan line. The width-to-length ratios of the second and third thin film transistors are the same but larger than that of the first thin film transistor. A first, second and third pixel electrodes are electrically connected with the first, the second and the third thin film transistors, respectively. A first, second and third common lines are disposed below the first, second and third pixel electrodes respectively. The first and second common lines are electrically connected to a first voltage and the third common line is electrically connected to a second voltage.

9 Claims, 8 Drawing Sheets

PIXEL STRUCTURE

CROSS-REFERENCE TO RELATED APPLICATION

This application claims the priority benefit of Taiwan application Ser. No. 95136208, filed Sep. 29, 2006. All disclosure of the Taiwan application is incorporated herein by reference.

BACKGROUND OF THE INVENTION

1. Field of the Invention

The present invention relates to a pixel structure, and more particularly to a pixel structure of a liquid crystal display.

2. Description of Related Art

Because of the high picture quality, high spatial utilization, low power consumption, radiation-free operation of thin film transistor liquid crystal display (TFT-LCD), it has become one of the mainstream displays in the market. At present, some of the basic demands on the liquid crystal display include properties such as a high contrast ratio, rapid response and wide viewing angle. The technologies capable of providing a wide viewing angle include, for example, multi-domain vertical alignment (MVA), multi-domain horizontal alignment (MHA), twisted nematic plus wide viewing film (TN+ film) and in-plane switching (IPS).

Although a thin film transistor liquid crystal display with multi-domain vertical alignment can achieve the purpose of having a wide viewing angle, the presence of color washout problem is a major drawback. The so-called color washout refers to a viewer seeing different color scale adjustments of the image when the viewer views an image on a display at different angles. For example, the viewer may see a white-bias image when viewed at a more inclined angle.

At present, some methods for resolving the color washout problem have been proposed, including using a retardation film, reducing the cell gap or forming two different liquid crystal capacitors inside a single pixel structure. However, the effect produced by using a retardation film is quite limited, and reducing the cell gap would lower the yield and brightness. On the other hand, the method of forming two different liquid crystal capacitors of a single pixel structure requires the formation of an additional dielectric layer, which may cause mura and residual image problems.

SUMMARY OF THE INVENTION

Accordingly, the present invention is directed to provide a pixel structure for reducing color washout, maintaining yield and brightness, and resolving mura and residual image problems.

The present invention provides a pixel structure. The pixel structure includes a data line, at least one scan line, a first thin film transistor, a second thin film transistor, a third thin film transistor, a first pixel electrode, a second pixel electrode, a third pixel electrode, a first common line, a second common line and a third common line. The data line and the scan line are disposed over a substrate. The first, second and third thin film transistors are electrically connected with the data line and the scan line respectively. Furthermore, the first, second and third thin film transistors have a first width-to-length ratio (W1/L1), a second width-to-length ratio (W2/L2) and a third width-to-length ratio (W3/L3) respectively. The first width-to-length ratio is smaller than the second width-to-length ratio, and the second width-to-length ratio and the third width-to-length ratio are the same. The first, second and third pixel electrodes are electrically connected with the first, the second and the third thin film transistors respectively. The first, second, and third common lines are disposed below the first, second and third pixel electrodes respectively. The first and second common lines are electrically connected to a first voltage and the third common line is electrically connected to a second voltage.

In an embodiment of the present invention, the foregoing first, second and third thin film transistors use a part of the scan line to serve as their gates. In addition, the foregoing first, second and third thin film transistors use a source electrically connecting to the data line to serve as their sources. Furthermore, the drains of the first, second, and third thin film transistors are electrically connected with the first, second and third pixel electrodes respectively.

In an embodiment of the present invention, the foregoing at least one scan line includes a first scan line and a second scan line. The first and second thin film transistors are electrically connected with the first scan line, and the third thin film transistor is electrically connected with the second scan line. In addition, the first and second thin film transistors both use a part of the first scan line to serve as their gates. Furthermore, the first and second thin film transistors both use a source electrically connecting to the data line to serve as their sources. Moreover, the drains of the first and second thin film transistors are electrically connected to the first and second pixel electrodes respectively. On the other hand, the third thin film transistor uses a part of the second scan line to serve as its gate, the source of the third thin film transistor is electrically connected with the data line, and the drain of the third thin film transistor is electrically connected with the third pixel electrode.

In an embodiment of the present invention, the foregoing second voltage is an alternating voltage.

In an embodiment of the present invention, the foregoing pixel structure further includes a plurality of protrusions disposed over the first, second and third pixel electrodes.

In an embodiment of the present invention, the foregoing first, second and third pixel electrodes further include a plurality of slits disposed therein.

In an embodiment of the present invention, the foregoing pixel structure further includes a first contact, a second contact and a third contact for electrically connecting the first, second and third pixel electrodes with the first, second and third thin film transistors respectively. The first, second and third contacts are correspondingly disposed over the first, second and third common lines.

The present invention also provides an alternative pixel structure. The pixel structure includes a data line, at least one scan line, a first thin film transistor, a second thin film transistor, a third thin film transistor, an impedance layer, a first pixel electrode, a second pixel electrode, a third pixel electrode, a first common line, a second common line and a third common line. The data line and the scan line are disposed over a substrate. The first, second and third thin film transistors are electrically connected with the data line and the scan line respectively. Furthermore, the first, second and third thin film transistors have a first width-to-length ratio, a second width-to-length ratio and a third width-to-length ratio respectively. The first, second, and third width-to-length ratios are the same. In addition, the impedance layer and the first thin film transistor are connected in series. The first, second and third pixel electrodes are electrically connected with the first, the second and the third thin film transistors respectively. The first, second and third common lines are disposed below the first, second and third pixel electrodes respectively. The first and second common lines are electrically connected to a first voltage and the third common line is electrically connected to a second voltage.

In an embodiment of the present invention, the foregoing impedance layer is an amorphous silicon layer.

In an embodiment of the present invention, the foregoing impedance layer is connected with the first thin film transistor in series.

In an embodiment of the present invention, the foregoing first, second and third thin film transistor use a part of the scan line to serve as their gates. In addition, the foregoing first, second and third thin film transistor use a source electrically connecting to the data line to serve as their sources. Furthermore, the drains of the first, second and third thin film transistors are electrically connected with the first, second and third pixel electrodes respectively.

In an embodiment of the present invention, the foregoing at least one scan line includes a first scan line and a second scan line. The first and second thin film transistors are electrically connected with the first scan line, and the third thin film transistor is electrically connected with the second scan line. In addition, the first and second thin film transistors both use a part of the first scan line to serve as their gates. Furthermore, the first and second thin film transistors both use a source electrically connecting with the data line to serve as their sources. Moreover, the drains of the first and second thin film transistors are electrically connected with the first and second pixel electrodes respectively. The third thin film transistor uses a part of the second scan line to serve as its gate, the source of the third thin film transistor is electrically connected with the data line, and the drain of the third thin film transistor is electrically connected with the third pixel electrode.

In an embodiment of the present invention, the foregoing second voltage is an alternating voltage.

In an embodiment of the present invention, the foregoing pixel structure further comprises a plurality of protrusions disposed over the first, second and third pixel electrodes.

In an embodiment of the present invention, the foregoing first, second and third pixel electrodes further comprise a plurality of slits disposed therein.

In an embodiment of the present invention, the foregoing pixel structure further includes a first contact, a second contact and a third contact for electrically connecting the first, second, and third pixel electrodes with the first, second and third thin film transistors respectively. The first, second and third contacts are correspondingly disposed over the first, second and third common lines.

With the use of the foregoing structure in the present invention, the first pixel electrode, the second pixel electrode and the third pixel electrode all have different voltage values when the pixel structure is driven. Hence, the liquid crystal molecules on the pixel structure can have various tilt angles to reduce the color washout problem.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

To resolve the color washout problem in the multi-domain vertical alignment thin film transistor liquid crystal display, the present invention provides a pixel structure with three pixel electrodes. These three pixel electrodes are electrically connected with the three thin film transistors respectively. The three thin film transistors would generate different charging rates when the pixel structure is driven. Therefore, the liquid crystal molecules above the pixel structure can produce various tilt angles and reduce the color washout problem. More specifically, the designer can adjust the width-to-length ratios of the thin film transistors, the disposition of the common lines and the resistivity of the drain to generate different charging rates. In the following, a first embodiment and a second embodiment are described to illustrate the present invention in greater detail.

First Embodiment

Figure 1A:
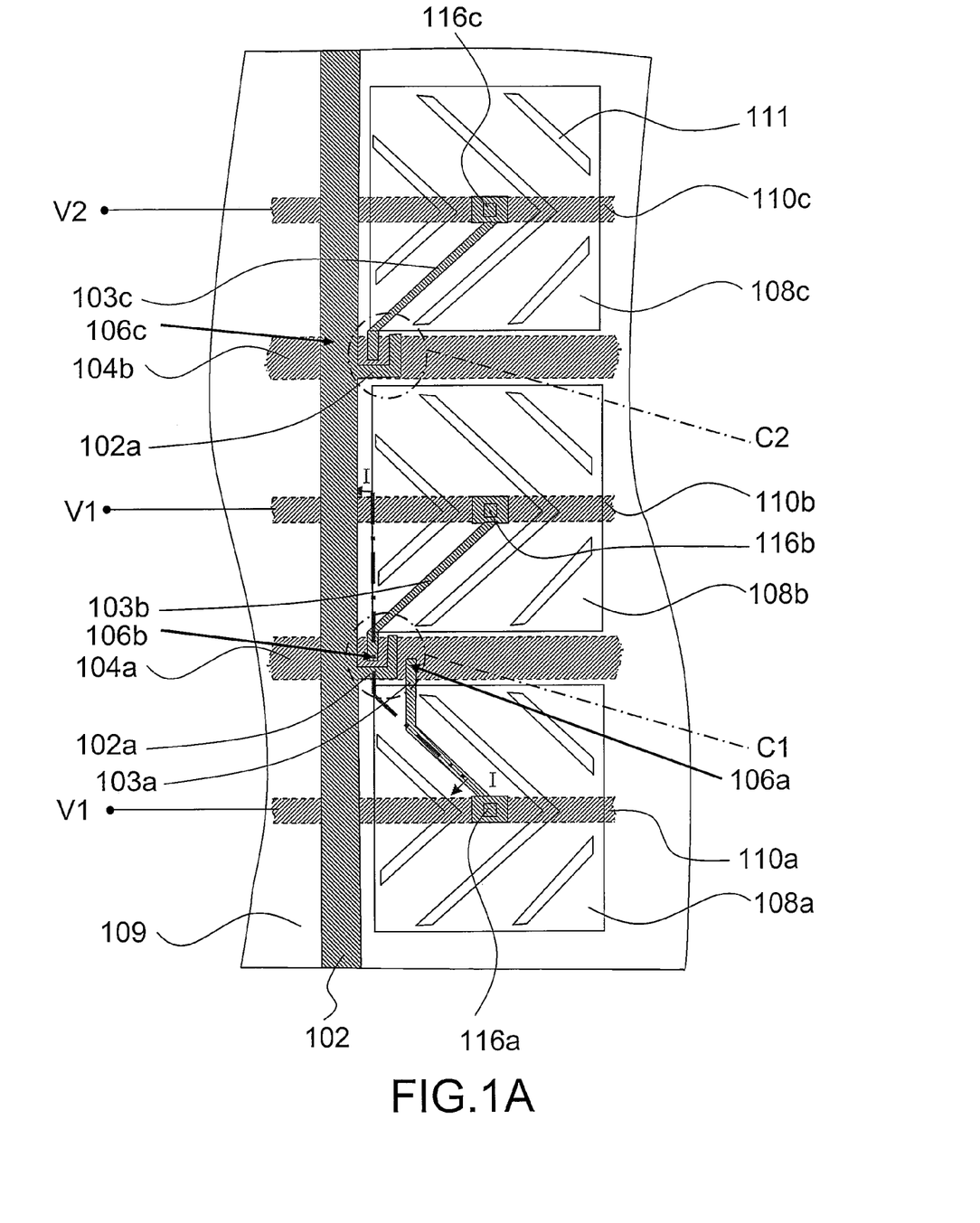
FIG. 1A is a top view of a pixel structure according to a first embodiment of the present invention.
Figure 1B:
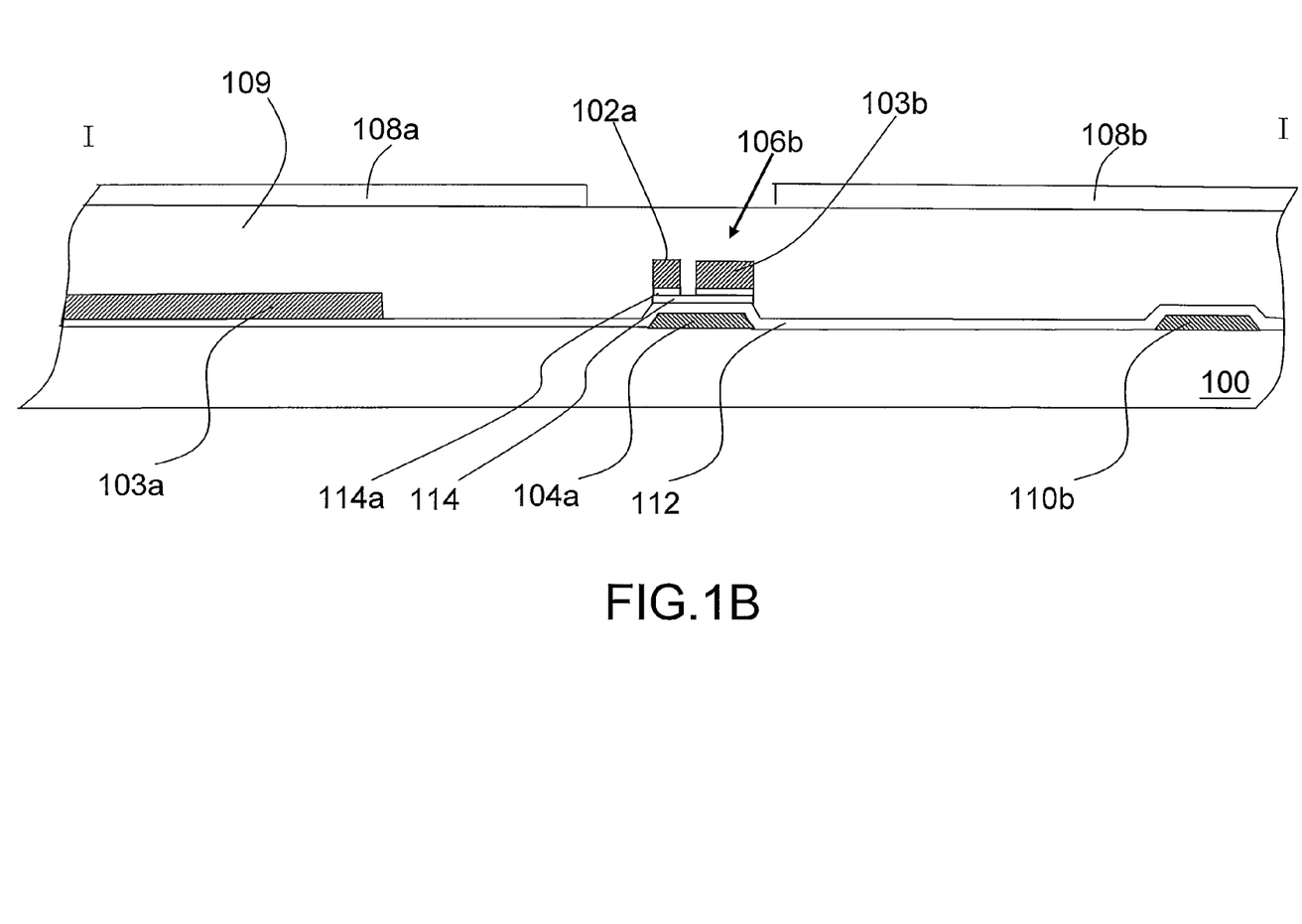
FIG. 1B is a schematic view along cross-sectional line I-I of FIG. 1A.
Figure 1C:
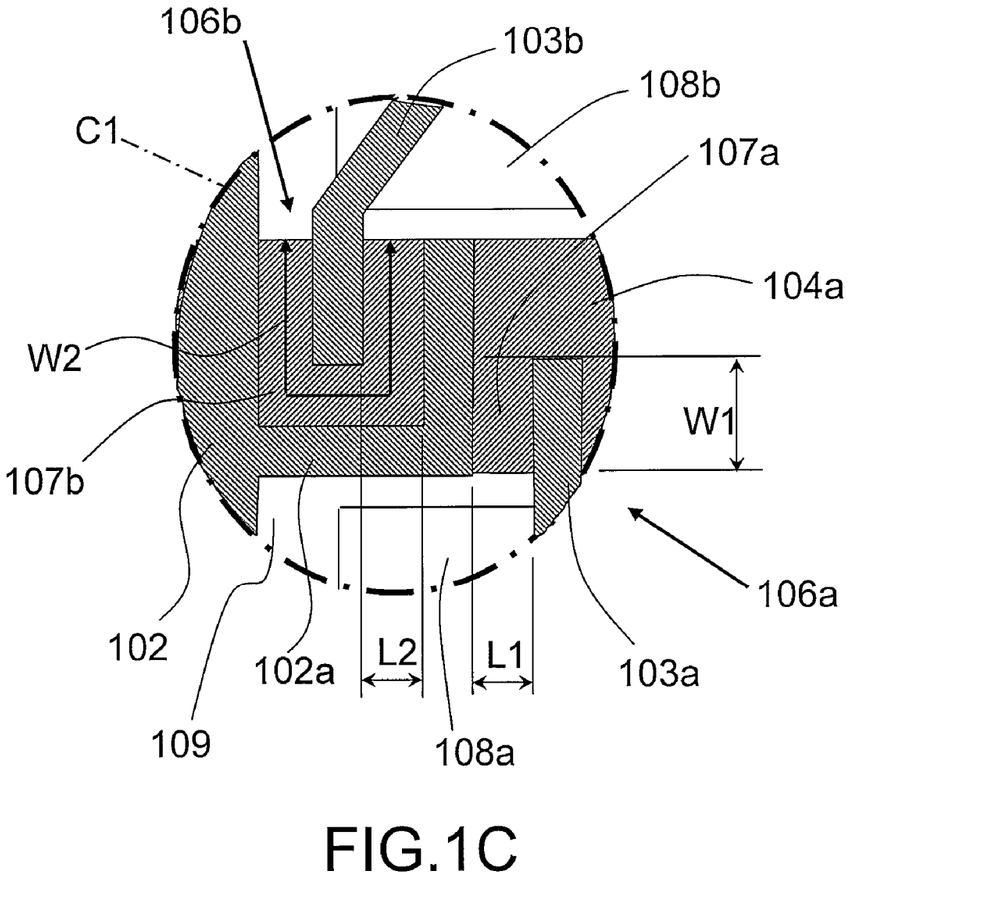
FIG. 1C is a locally magnified view of area C1 in FIG. 1A.
Figure 1D:
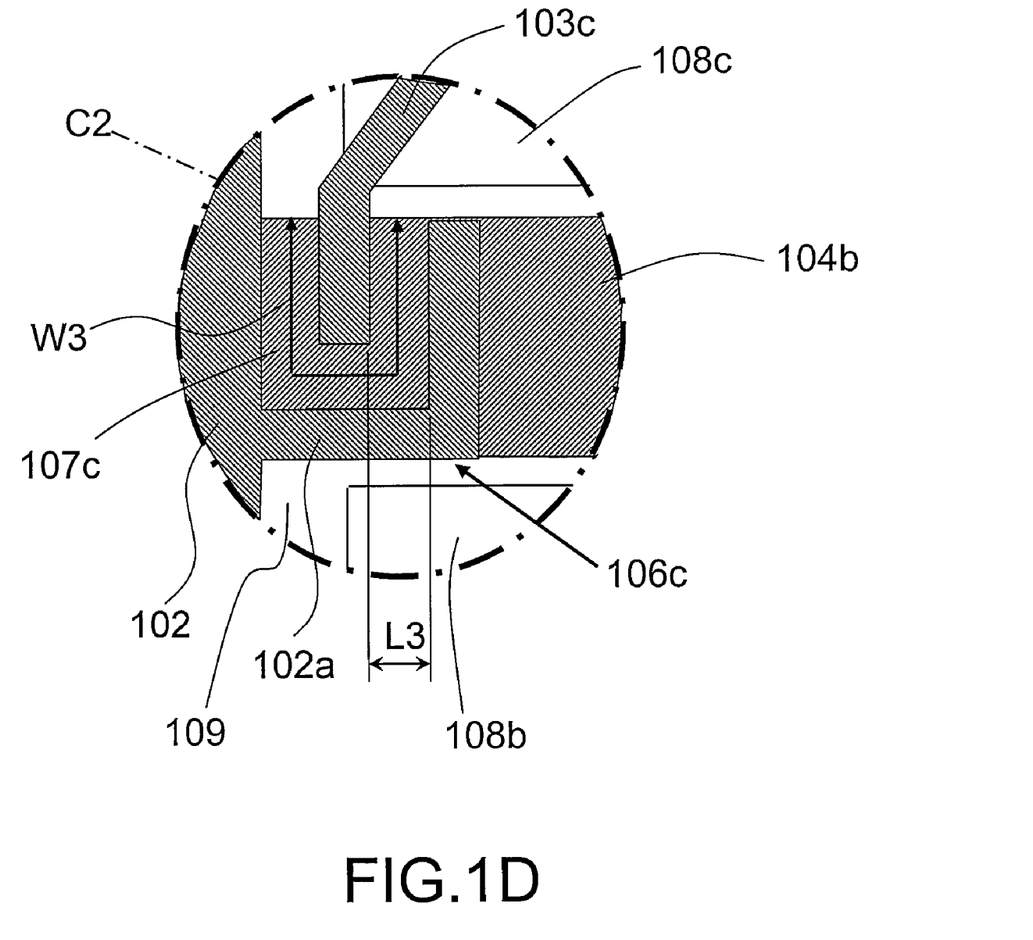
FIG. 1D is a locally magnified view of area C2 in FIG. 1A.

FIG. 1A is a top view of a pixel structure according to a first embodiment of the present invention. FIG. 1B is a schematic view along cross-sectional line I-I of FIG. 1A. FIG. 1C is a locally magnified view of area C1 in FIG. 1A. FIG. 1D is a locally magnified view of area C2 in FIG. 1A.

As shown in FIGS. 1A and 1B, the pixel structure in the present embodiment comprises a substrate 100, a data line 102, a first scan line 104a, a second scan line 104b, a first thin film transistor 106a, a second thin film transistor 106b, a third thin film transistor 106c, a first pixel electrode 108a, a second pixel electrode 108b, a third pixel electrode 108c, a first common line 110a, a second common line 110b and a third common line 110c. The data line 102, the first scan line 104a and the second scan line 104b are disposed over the substrate 100. The first thin film transistor 106a, the second thin film transistor 106b and the third thin film transistor 106c are electrically connected with the data line 102 and the first scan line 104a and the second scan line 104b respectively. In addition, the first pixel electrode 108a, the second pixel electrode 108b and the third pixel electrode 108c are electrically connected with the first thin film transistor 106a, the second thin film transistor 106b and the third thin film transistor 106c respectively.

Furthermore, the first common line 110a, the second common line 110b and the third common line 110c are respectively disposed below the first pixel electrode 108a, the second pixel electrode 108b and the third pixel electrode 108c. The pixel structure further includes a dielectric layer 109 disposed below the first pixel electrode 108a, the second pixel electrode 108b and the third pixel electrode 108c and formed over the substrate 100 for electrically insulating the first, second, and third pixel electrodes 108a, 108b, 108c from the data line 102. The first common line 110a, the second common line 110b and the third common line 110c serve as the lower electrodes of storage capacitors. The first, second, and third thin film transistors 106a, 106b and 106c have a first drain 103a, a second drain 103b and a third drain 103c respectively. The first, second, and third pixel electrodes 108a, 108b, 108c respectively electrically connecting with the first drain 103a, the second drain 103b and the third drain 103c serve as the upper electrodes of the storage capacitors. The dielectric layer (for example, the dielectric layer 112) between the lower and the upper electrodes serves as a capacitor dielectric layer of the storage capacitors.

As shown in FIGS. 1A to 1D, the first thin film transistor 106a, the second thin film transistor 106b and the third thin film transistor 106c have a first 107a, a second 107b and a third 107c respectively. The first 107a, the second 107b and the third 107c have lengths L1, L2, L3 and widths W1, W2, W3 respectively. It is noted that the pixel structure in the present invention utilizes the width-to-length ratios to provide the pixel electrodes with different charging rates. More specifically, the first thin film transistor 106a, the second thin film transistor 106b and the third thin film transistor 106c have a first width-to-length ratio W1/L1, a second width-to-length ratio W2/L2 and a third width-to-length ratio W3/L3 respectively. The first width-to-length ratio W1/L1 is smaller than the second width-to-length ratio W2/L2, but the second width-to-length ratio W2/L2 and the third width-to-length ratio W3/L3 are the same.

The first common line 110a and the second common line 110b are electrically connected to a first voltage V1, and the third common line 110c is electrically connected to a second voltage V2. The first voltage V1 is a fixed voltage or grounded and the second voltage V2 is an alternating voltage, for example. The alternating voltage is a rising signal in a positive polarity of the frame time and is a falling signal in a negative polarity of the frame time. Therefore, when the pixel structure is driven, the third pixel electrode 108c would have a greater voltage (greater than the voltage of the first pixel electrode 108a and the second pixel electrode 108b) due to the capacitor coupling effect of the alternating voltage. Consequently, the liquid crystal molecules above the third pixel electrode 108c have a different tilt angles from the liquid crystal molecules above the first pixel electrode 108a and the second pixel electrode 108b, thereby reducing the color washout problem.

Moreover, the present embodiment uses the pixel structure of a multi-domain vertical alignment liquid crystal display as an example. Hence, protrusions 111 may be further disposed above the first pixel electrode 108a, the second pixel electrode 108b and the third pixel electrode 108c. In another embodiment, the pixel electrodes are disposed with a plurality of slits 111 therein. However, the present invention is not limited as such. In other words, the pixel structure can be applied to other types of liquid crystal displays.

Through the above design, the voltage of the second pixel electrode 108b electrically connected with the second thin film transistor 106b would be equal to the voltage of the third pixel electrode 108c electrically connected with the third thin film transistor 106c. The voltage of the second pixel electrode 108b electrically connected with the second thin film transistor 106b would be greater than the voltage of the first pixel electrode 108a electrically connected with the first thin film transistor 106a. When the pixel is driven, the voltage of the third pixel electrode 108b would be greater than that of the second pixel electrode 108b due to the alternating voltage coupling effect, and the voltage of the second pixel electrode 108b would be greater than that of the first pixel electrode 108a.

Accordingly, if the effect caused by the width-to-length ratio is the only consideration, the voltage of the second pixel electrode 108b would be equal to that of the third pixel electrode 108c while the voltage of the second pixel electrode 108b would be greater than that of the first pixel electrode 108a when the pixel structure is driven. However, as described in above, the second voltage V2 would further increase the voltage of the third pixel electrode 108c. Thus, the first pixel electrode 108a, the second pixel electrode 108b and the third pixel electrode 108c would have three different voltages when the pixel structure is driven. Because the liquid crystal molecules above the pixel structure might have three different tilt angles, the color washout problem is effectively reduced. If the pixel structure is applied to a multi-domain vertical alignment liquid crystal display, the design of having three different voltages in each pixel structure is able to provide more domains to the liquid crystal display and hence reduce the color washout problem.

Again, as shown in FIGS. 1A to 1D, the components of the first thin film transistor 106a, the second thin film transistor 106b and the third thin film transistor 106c comprise a source 102a, a first drain 103a, a second drain 103b, a third drain 103c, a gate insulation layer 112, a semiconductor layer 114 and an ohmic contact layer 114a. The first drain 103a, the second drain 103b, the third drain 103c belong to the first thin film transistor 106a, the second thin film transistor 106b and the third thin film transistor 106c respectively. In addition, the source 102a, the gate insulation layer 112, the semiconductor layer 114 and the ohmic contact layer 114a disposed in different locations are the components of the first thin film transistor 106a, the second thin film transistor 106b and the third thin film transistor 106c respectively. The gate insulation layer 112 covers the substrate 100, the first scan line 104a and the second scan line 104b. The semiconductor layer 114 is disposed on the gate insulation layer 112 above the first scan line 104a and the second scan line 104b. The source 102a is disposed on the semiconductor layer 114. The first drain 103a and the second drain 103b are disposed on the gate insulation layer 112 above the first scan line 104a, and the third drain 103c is disposed on the gate insulation layer 112 above the second scan line 104b. The ohmic contact layer 114a is disposed between the semiconductor layer 114 and the source 102a, first drain 103a, second drain 103b and third drain 103c.

In addition, the first thin film transistor 106a and the second thin film transistor 106b are electrically connected with the first scan line 104a and the third thin film transistor 106c is electrically connected with the second scan line 104b, for example. In the present embodiment, the first thin film transistor 106a and the second thin film transistor 106b both, for example, use a part of the first scan line 104a to serve as their gates and use a part of a source 102a that is electrically connected with the data line 102 to serve as their sources. Furthermore, the third thin film transistor 106c, for example, uses a part of the second scan line 104b to serve as its gate. The source 102a of the third thin film transistor 106a, for example, is electrically connected with the data line 102, and the third drain 103c of the third thin film transistor 106c, for example, is electrically connected with the third pixel electrode 108c. In the present embodiment, the pixel electrodes have a higher aperture ratio because all three thin film transistors use the scan line as their gates.

Figure 2:
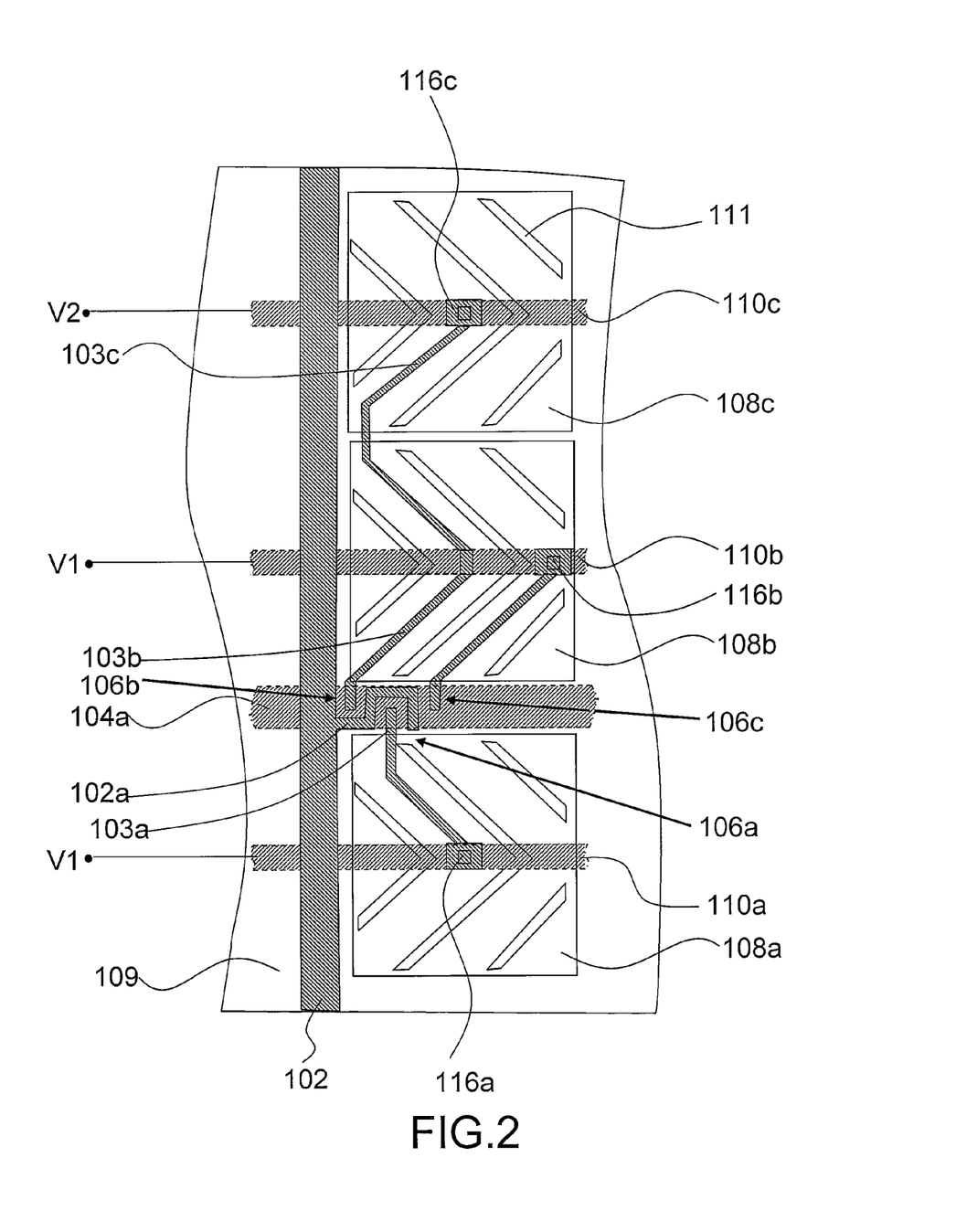
FIG. 2 is a top view of a pixel structure according to another embodiment of the present invention.

FIG. 2 is a top view of a pixel structure according to another embodiment of the present invention. As shown in FIG. 2, all three thin film transistors might use the first scan line 104a as their gates and eliminate the second scan line 104b altogether. In FIG. 2, the first thin film transistor 106a, the second thin film transistor 106b and the third thin film transistor 106c, for example, use the source 102a electrically connecting with the data line 102 to serve as their gates. Furthermore, the first drain 103a, the second drain 103b and the third drain 103c, for example, are electrically connected with the first pixel electrode 108a, the second pixel electrode 108b and the third pixel electrode 108c respectively. Because the thin film transistors use a part of the scan line to serve as their gates, the pixel structure can have a higher aperture ratio. Since the main difference between the pixel structure in FIG. 2 and the one in FIG. 1A is only the foregoing and identical components are labeled identically, a detailed description of these components is not repeated. Obviously, the pixel structure in the present invention is not limited as such. In other words, the thin film transistors may use the gates that are electrically connected with the scan lines respectively.

As shown in FIG. 1A, the pixel structure may further include a first contact 116a, a second contact 116b and a third contact 116c for electrically connecting the first pixel electrode 108a, the second pixel electrode 108b and the third pixel electrode 108c with the first thin film transistor 106a, the second thin film transistor 106b and the third thin film transistor 106c respectively. The first contact 116a, the second contact 116b and the third contact 116c are correspondingly disposed over the first common line 110a, the second common line 110b and the third common line 110c, for example.

In the present invention, by adjusting the width-to-length ratios and applying different voltages to the common lines, the thin film transistors within the three areas of each pixel structure have different charging rates. Therefore, all three pixel electrodes would produce a different voltage when the pixel structure is driven. In the following, a second embodiment of the pixel structure is described to illustrate another application of the foregoing concept.

Second Embodiment

Figure 3A:
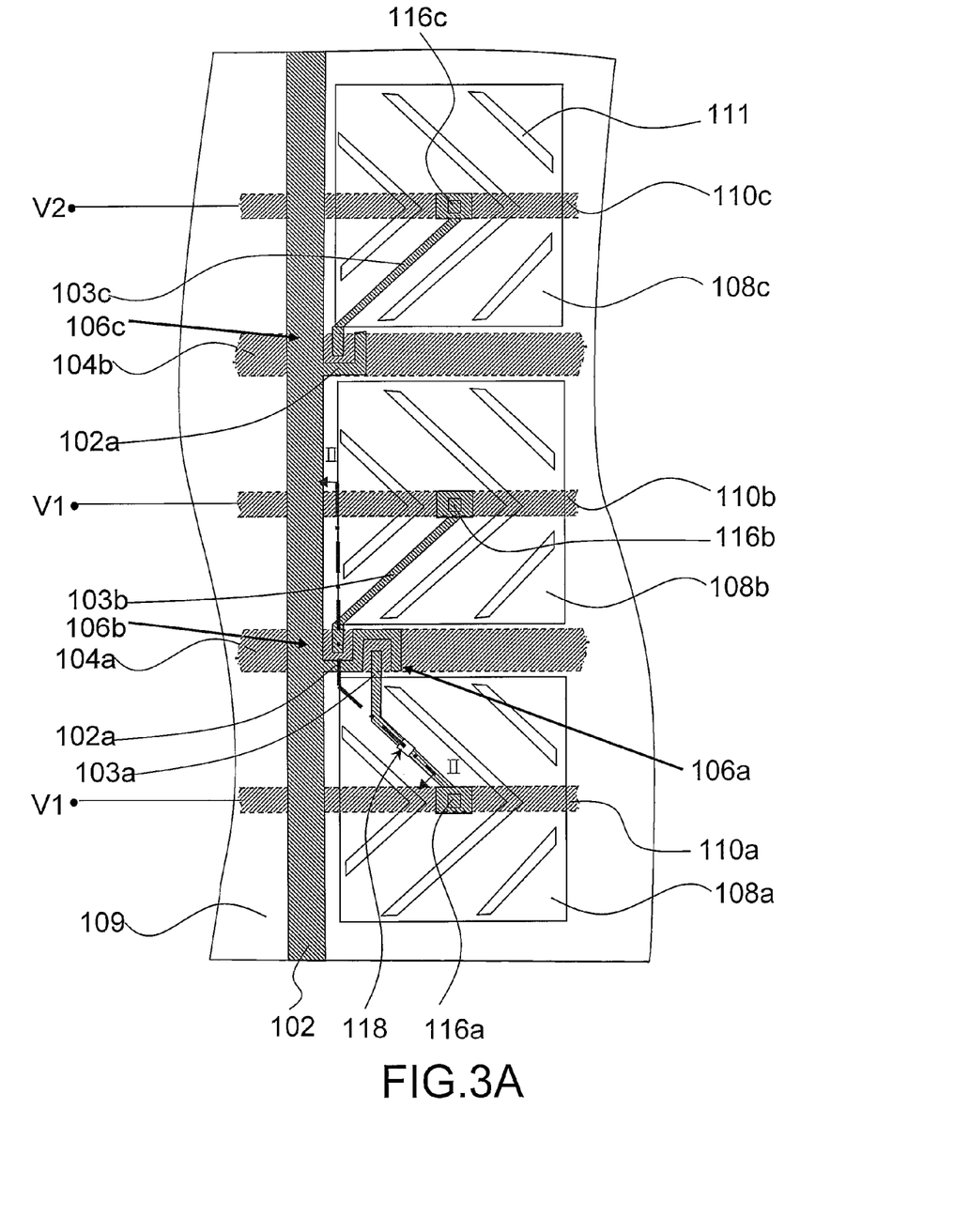
FIG. 3A is a top view of a pixel structure according to a second embodiment of the present invention.
Figure 3B:
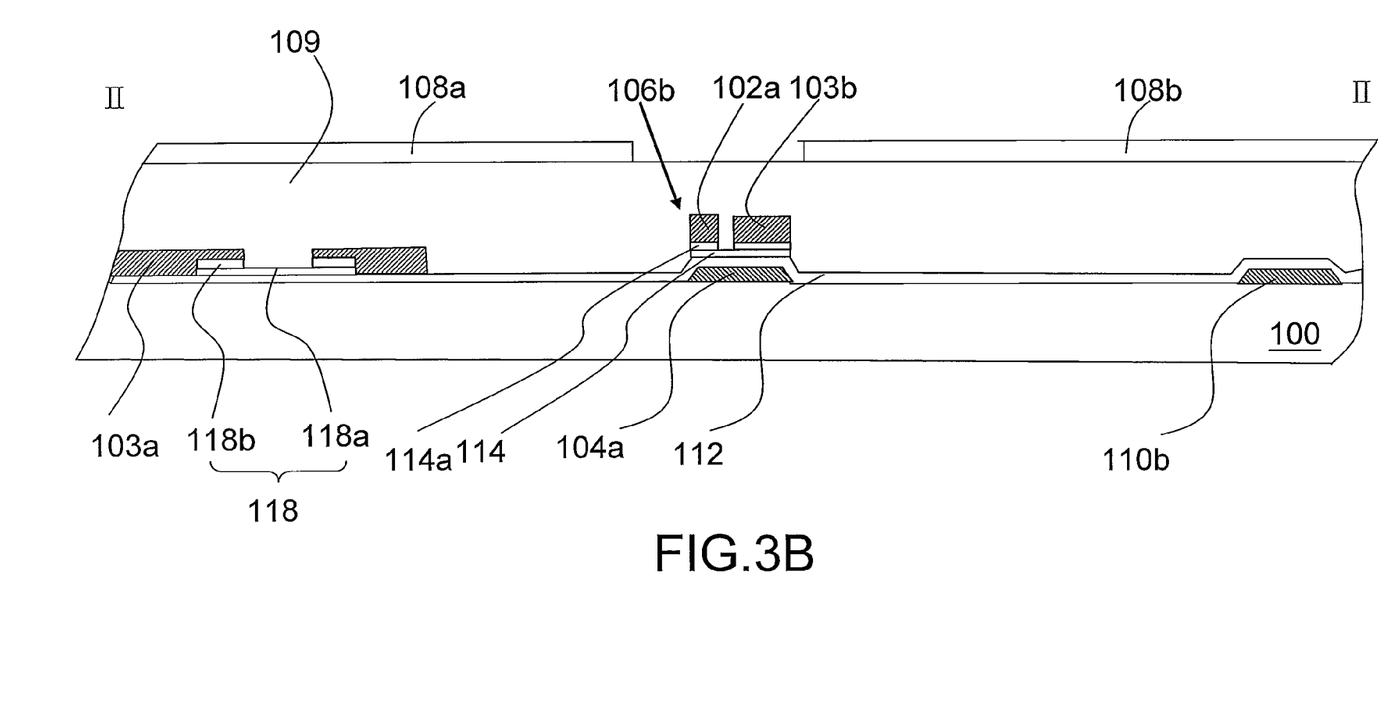
FIG. 3B is a schematic view along cross-sectional line II-II of FIG. 3A.

FIG. 3A is a top view of a pixel structure according to a second embodiment of the present invention. FIG. 3B is a schematic view along cross-sectional line II-II of FIG. 3A. In the second embodiment, the components of the pixel structure identical to the ones in the first embodiment are labeled identically. Moreover, only the portions that are different from the first embodiment are described below. In addition, any types of extensions that are applicable to the first embodiment may also be applied to the pixel structure of the second embodiment.

As shown in FIGS. 3A and 3B, the main difference between the pixel structure in the second embodiment and the one in the first embodiment is that the first width-to-length ratio W1/L1, the second width-to-length ratio W2/L2 and the third width-to-length ratio W3/L3 are all the same. Similarly, the first common line 110a and the second common line 110b are electrically connected to the first voltage V1 and the third common line 110c is electrically connected to the second voltage V2. The first voltage V1 is either a DC voltage or grounded and the second voltage V2 is an alternating voltage, for example. Furthermore, the pixel structure further includes an impedance layer 118 for enhancing the resistance of the first drain 103a so that the resistance of the first drain 103a is greater than that of the second drain 103b and the third drain 103c.

Although the first width-to-length ratio W1/L1, the second width-to-length ratio W2/L2 and the third width-to-length ratio W3/L3 are all the same in the present embodiment, the voltage of the first pixel electrode 108a is smaller than that of the second pixel electrode 108b and the voltage of the third pixel electrode 108c is increased due to the coupling effect of an alternating voltage when the pixel structure is driven because the first drain 103a of the first thin film transistor has a higher resistance and the third common line 110c is electrically connected with the second voltage V2. Consequently, the first pixel electrode 108a, the second pixel electrode 108b and the third pixel electrode 108c have three different voltages. Thus, the liquid crystal molecules above the pixel structure would have three tilt angles to reduce the color washout problem.

As shown in FIG. 3B, the impedance layer 118, for example, comprises a semiconductor layer 118a and an ohmic contact layer 118b. In the process of fabricating the pixel structure, the semiconductor layer 118a is formed together with the semiconductor layer 114, for example. The semiconductor layer 114 and the semiconductor layer 118a, for example, are an amorphous silicon layer. Furthermore, the ohmic contact layers 114a and 118b, for example, are simultaneously formed. The ohmic contact layers 114a and 118b includes, for example, a doped amorphous silicon layer. It should be noted that the impedance layer 118, for example, is connected with the first drain 103a of the first thin film transistor 106a in series to increase the resistance of the first drain 103a. Obviously, the second drain 103b or the third drain 103c may be connected to other impedance layers in series to adjust the resistance of the drain and meet all kinds of design specifications.

Figure 4:
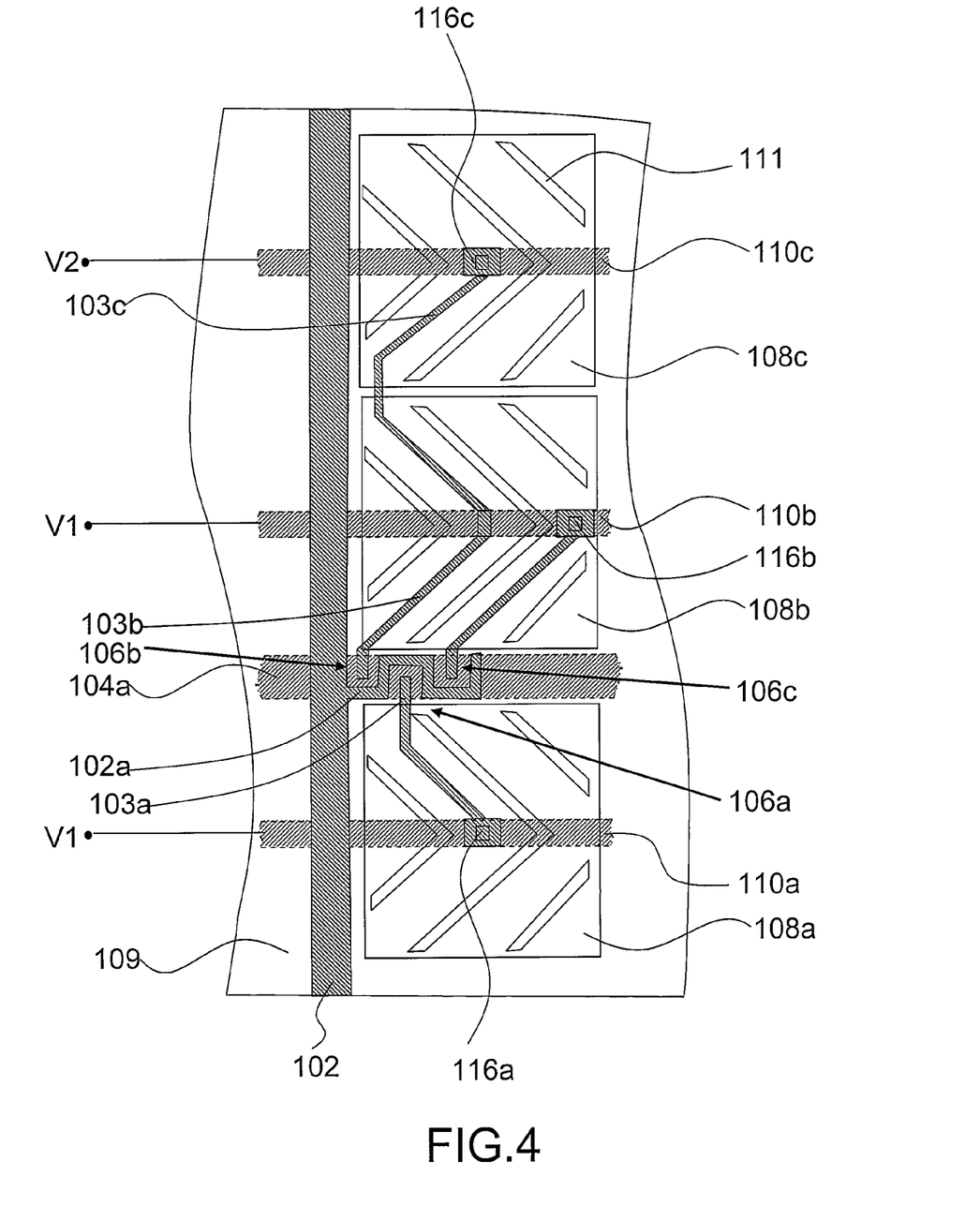
FIG. 4 is a top view of a pixel structure according to yet another embodiment of the present invention.

To increase the aperture ratio of the pixel structure, the design shown in FIG. 4 can be used. FIG. 4 is a top view of a pixel structure according to yet another embodiment of the present invention. As shown in FIG. 4, the first thin film transistor 106a, the second thin film transistor 106b and the third thin film transistor 106c use the first scan line 104a to serve as their gates. In addition, the pixel structure also eliminates the second scan line 104b and the source 102a above the second scan line 104b.

To ensure a specific relationship between the width-to-length ratios of the three thin film transistors in all of the above embodiments, the channels can be designed with all kinds of shapes. In the present invention, the shape of the in the thin film transistors is not restricted as long as their width-to-length ratios are able to follow a desired relationship.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, comprising:
a single data line and at least one scan line, disposed over a substrate;
a first thin film transistor, a second thin film transistor and a third thin film transistor, electrically connected with the single data line and the scan line, and the first, second, and third thin film transistors respectively have a first width-to-length ratio, a second width-to-length ratio and a third width-to-length ratio, wherein the first width-to-length ratio is smaller than the second width-to-length ratio, and the second width-to-length ratio and the third width-to-length ratio are the same;

a first pixel electrode, a second pixel electrode and a third pixel electrode, electrically connected with the first, second, and third thin film transistors, respectively; and a first common line, a second common line and a third common line, disposed below the first, second and third pixel electrodes respectively, wherein the first and second common lines are electrically connected to a first voltage, and the third common line is electrically connected to a second voltage which is different from the first voltage.

2. The pixel structure of claim 1, wherein the first, second, and third thin film transistors use a part of the scan line to serve as their gates, the first, second and third thin film transistors use a source electrically connecting with the data line to serve as their sources, and drains of the first, second and third thin film transistors are electrically connected to the first, second and third pixel electrodes respectively.

3. The pixel structure of claim 1, wherein the at least one scan line comprises a first scan line and a second scan line and the first and second thin film transistors are electrically connected to the first scan line and the third thin film transistor is electrically connected to the second scan line.

4. The pixel structure of claim 3, wherein the first and second thin film transistors both use a part of the first scan line to serve as their gates, the first and second thin film transistors both use a source electrically connecting with the data line to serve as their sources, and drains of the first and second thin film transistors are electrically connected to the first and second pixel electrodes respectively.

5. The pixel structure of claim 3, wherein the third thin film transistor uses a part of the second scan line to serve as its gate, a source of the third thin film transistor is electrically connected with the data line, and a drain of the third thin film transistor is electrically connected with the third pixel electrode.

6. The pixel structure of claim 1, wherein the first voltage is a fixed voltage or grounded while the second voltage is an alternating voltage.

7. The pixel structure of claim 1, further comprising a plurality of protrusions disposed over the first, second and third pixel electrodes.

8. The pixel structure of claim 1, wherein the first, second and third pixel electrodes further comprise a plurality of slits disposed therein.

9. The pixel structure of claim 1, further comprising a first contact, a second contact and a third contact for electrically connecting the first, second and third pixel electrodes with the first, second and third thin film transistors respectively, wherein the first, second and third contacts are correspondingly disposed over the first, second and third common lines.

* * * * *